(12) United States Patent
Räikkönen (10) Patent No.: US 11,513,342 B2
(45) Date of Patent: Nov. 29, 2022

(54) LASER ARRANGEMENT

(71) Applicant: Hitachi High-Tech Analytical Science Finland Oy, Espoo (FI)

(72) Inventor: Esa Räikkönen, Espoo (FI)

(73) Assignee: Hitachi High-Tech Analytical Science Finland Oy, Espoo (FI)

( * ) Notice: Subject to any disclaimer, the term of this patent is extended or adjusted under 35 U.S.C. 154(b) by 205 days.

(21) Appl. No.: 16/861,716

(22) Filed: Apr. 29, 2020

(65) Prior Publication Data

US 2020/0341266 A1    Oct. 29, 2020

(30) Foreign Application Priority Data

Apr. 29, 2019 (EP) .................................... 19171481

(51) Int. Cl.

| | |
|---|---|
| *G01J 3/443* | (2006.01) |
| *G02B 26/08* | (2006.01) |
| *G01J 3/02* | (2006.01) |
| *G02B 19/00* | (2006.01) |
| *H01S 3/00* | (2006.01) |
| *H01S 3/094* | (2006.01) |
| *H01S 3/11* | (2006.01) |
| *H01S 3/06* | (2006.01) |

(52) U.S. Cl.
CPC ........ *G02B 26/0875* (2013.01); *G01J 3/0208* (2013.01); *G01J 3/443* (2013.01); *G02B 19/0047* (2013.01); *H01S 3/005* (2013.01); *H01S 3/094038* (2013.01); *H01S 3/11* (2013.01); *H01S 3/0602* (2013.01)

(58) Field of Classification Search
CPC ............... G02B 26/0875; G01J 3/0208; H01S 3/094038; H01S 3/094049; H01S 3/125; H01S 3/123
See application file for complete search history.

(56) References Cited

U.S. PATENT DOCUMENTS 5,917,843 A * 6/1999 Greene .................. H01S 3/082
372/100
7,394,537 B1* 7/2008 Lindfors .............. G01N 21/718
356/318

(Continued)

FOREIGN PATENT DOCUMENTS

| WO | WO-2006058381 A1 * | 6/2006 | ............... H01S 3/30 |
| WO | 2013017881 A1 | 2/2013 | |

OTHER PUBLICATIONS

European Search Report issued by the European Patent Office in Application No. EP19171481 dated Oct. 18, 2019. 2 pages.

(Continued)

*Primary Examiner* — Maurice C Smith (74) *Attorney, Agent, or Firm* — Meunier Carlin & Curfman LLC (57) ABSTRACT

In accordance with an example embodiment, a laser arrangement is provided, the laser arrangement comprising a light source for generating light output; a collimator assembly for collimating the light output from the light source into a pump beam; an optical resonator assembly for generating pulsed output beam based on the pump beam directed thereat; and a beam displacement assembly for laterally shifting the pump beam to adjust the position at which the pump beam meets a surface of the optical resonator assembly.

22 Claims, 3 Drawing Sheets

(56) References Cited

U.S. PATENT DOCUMENTS

| | | |
|---|---|---|
| 2011/0023807 A1 | 2/2011 | Weinrotter et al. |
| 2012/0312267 A1 | 12/2012 | Ridderbusch |
| 2014/0209794 A1* | 7/2014 | Woodruff ............. G01N 21/718 |
| | | 250/226 |

OTHER PUBLICATIONS

Eckold, Matthew, Jacob I. Mackenzie, and W. Andrew Clarkson. "Approach for power scaling solid-state lasers with intracavity motion." Optics letters 42.4 (2017): 775-778.

* cited by examiner

LASER ARRANGEMENT

CROSS-REFERENCE TO RELATED APPLICATIONS

This application claims priority to, and the benefit of, European Patent Office Application No. 19171481.5, filed Apr. 29, 2019, which is incorporated by reference herein in its entirety.

TECHNICAL FIELD

The present invention relates to generation of a pulsed laser beam that is suitable, for example, for use as an excitation source in optical emission spectroscopy for analysis of elemental composition of a sample.

BACKGROUND

Analyzer devices that are capable of determining an elemental composition of a sample are available both as handheld or otherwise portable analyzer devices intended for field use and desktop devices intended for use in laboratory conditions and/or within industrial establishments. While several techniques for analyzing a sample are available, optical emission spectroscopy is widely employed in such analyzer devices to determine elemental composition of the sample under study. Such analyzer devices may be referred to as optical analyzers. An optical analyzer typically includes an excitation means for invoking an optical emission from a surface of a sample under study, a light collection arrangement for transferring the optical emission to a spectrometer for dispersing the optical emission into different wavelengths, a detector means for capturing signals that are descriptive of the dispersed optical emission and an analysis means for determination of the elemental composition of the sample under study on the basis of the captured signals.

A well-known example of such an optical analyzer employs laser-induced breakdown spectroscopy (LIBS) and it may be referred to as a LIBS analyzer. A LIBS analyzer comprises, as the excitation means, a laser assembly that is arranged to generate high peak power laser pulses. The laser pulses are focused to the sample under study to form a plasma plume on a surface of the sample. During plasma formation free electrons start to recombine with ions, and this event invokes optical emission at wavelength(s) that are characteristic to elements on the surface of the sample. The light emission is transferred via the light collection arrangement to the spectrometer, from which the dispersed optical emission is guided to the detector means, which captures detector signals that are descriptive of the dispersed optical emission and that serve as basis for analysis of elemental composition of the sample by the analysis means. The analysis is based on intensity distribution of dispersed optical emission across a range of wavelengths.

In a typical laser design suitable for use in a LIBS analyzer, high peak power laser pulses are generated by using a light source to pump energy into a gain medium with long fluorescence lifetime. The gain medium is placed in an optical resonator whose losses are initially kept at high enough value to prevent laser action while energy is being accumulated into the gain medium. The stored energy is released in a short high power laser pulse by quickly reducing the resonator loss. This technique is called Q-switching, and it may be realized with either a passive of actively controlled optical element called the Q-switch.

In previously known laser assemblies of such type the obtainable output power is limited by the heat generated in the gain medium: a straightforward approach for increasing the output power is to increase the power of the light source applied to pump energy to the gain medium, which results in increased heat generation in the gain medium. Excessive heat may result in damage in the gain medium and/or in other internal components of the laser assembly and, eventually, malfunction or even breakdown of the laser assembly. Hence, in such an approach the heat generated in the gain medium imposes a practical limit for the output power obtainable from such laser assembly.

On the other hand, increased output power would be beneficial in many applications making use of laser assemblies of such type. For example in LIBS analyzer, increased output power would enable shorter measurement time and/or higher measurement frequency, thereby allowing improved analysis performance for the LIBS analyzer.

SUMMARY

It is therefore an object of the present invention to provide a laser arrangement for generation of pulsed laser that enables increasing the output power without running a high risk of heat-induced damage in components of the laser arrangement.

In the following a simplified summary of some embodiments of the present invention is provided in order to facilitate a basic understanding of the invention. The summary is not, however, an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with an example embodiment, a laser arrangement is provided, the laser arrangement comprising a light source for generating light output; a collimator assembly for collimating the light output from the light source into a pump beam; an optical resonator assembly for generating pulsed output beam based on the pump beam directed thereat; and a beam displacement assembly for laterally shifting the pump beam to adjust the position at which the pump beam meets a surface of the optical resonator assembly.

In accordance with another example embodiment, a LIBS analyzer device for analysis of elemental composition is provided, the LIBS analyzer device comprising the laser arrangement according to the above-described example embodiment of the invention.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The verbs "to comprise" and "to include" are used in this document as open limitations that neither exclude nor require the existence of also un-recited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF DRAWINGS

The embodiments of the invention are illustrated by way of example, and not by way of limitation, in the figures of the accompanying drawings, where, FIG. 1 schematically illustrates some components of a laser arrangement according to an example.

DETAILED DESCRIPTION

Figure 1:
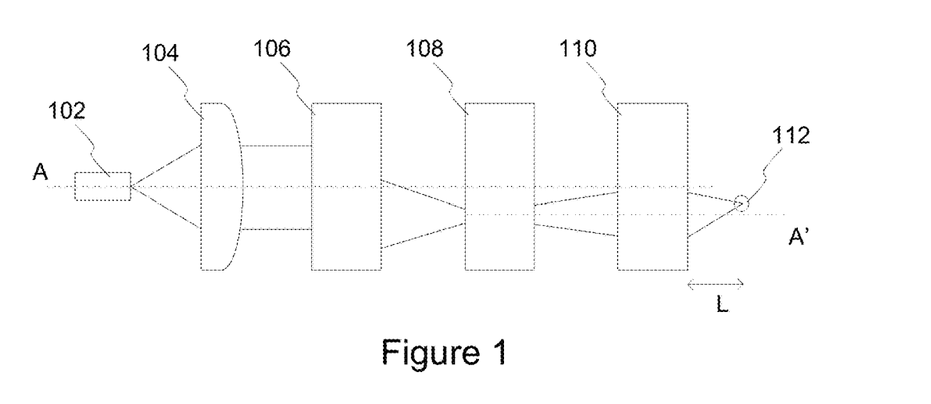

FIG. 1 schematically illustrates components of a laser arrangement 100 according to an example. As a non-limiting example, the laser arrangement 100 may be applied as an excitation source in analyzer device that is useable for analysis of elemental composition of a sample using optical emission spectroscopy, such as a LIBS analyzer. An example of such a non-limiting usage of the laser arrangement 100 is provided later in this text.

FIG. 1 illustrates the laser arrangement 100 comprising a light source 102 for generating light output, a collimator assembly 104 for collimating the light output from the light source 102 into a collimated pump beam, a beam displacement assembly 106 for laterally shifting the pump beam to adjust the position at which the pump beam meets a surface of an optical resonator assembly 108, the optical resonator assembly 108 for generating a pulsed output beam based on the shifted pump beam directed thereat, and an output beam focusing assembly 110 for focusing the pulsed output beam at a target point 112. Hence, the laser arrangement 100 may be operated to generate pulsed laser beam focused at the target point based on the pump beam derived based on the light output from the light source 102.

The components of the laser arrangement 100 illustrated in FIG. 1 represent logical of functional components of the underlying pump laser configuration, each logical component assigned with a function outlined in the foregoing. However, one or more components of the laser arrangement 100 shown in the example of FIG. 1 may be implemented using one or more sub-components in order to provide the function assigned herein for the respective (logical) component and/or two or more (logical) components shown in the example of FIG. 1 may be combined into a single component that provides respective combined functionality. The laser arrangement 100 may comprise further components in addition to those illustrated in the example of FIG. 1, whereas the components depicted in the example of FIG. 1 represent those components that are considered useful in describing structure and operation of a pump laser configuration according to the present invention.

The light source 102 is arranged to generate light output at a predefined wavelength or at a predefined range of wavelengths. The applied wavelength or the applied range of wavelengths is chosen to match the absorption spectrum of the laser gain medium in the optical resonator assembly 108 so that high absorption efficiency can be achieved. As non-limiting examples, the light source 102 may comprise a laser source or a laser diode (LD) arranged to provide light output of desired characteristics in (general) direction of the collimator assembly 104. In another example, the light source 102 comprises an end of an optical fiber that is arranged to transfer the light from remote light source arranged at the other end of the optical fiber (where the remote light source may comprise, for example, a laser source, a LD, etc.). The light output from light source 102 may comprise continuous light output, pulsed light output or modulated light output where a constant light intensity level is modulated by a pulse train.

The collimator assembly 104 is arranged to collimate the light output from the light source 102 into the pump beam. The collimator assembly 104 comprises one or more optical components arranged to confine or collimate a light beam emerging from the light source 102, which typically comprises a divergent light beam. The operation of the collimator assembly 104 may result in a pump beam that has a center axis that is coaxial or in parallel with the center axis A of the laser arrangement 100, which is indicated in the illustration of FIG. 1 by a respective dashed line. The axis A may be also considered as the optical axis of the output beam focusing assembly 110. The optical component(s) of the collimator assembly 104 may comprise e.g. one or more lenses and/or one or more mirrors. In the example shown in FIG. 1, the collimator assembly 104 comprises a single collimating lens that serves to convert the light output from the light source 102 into the pump beam having the center axis A.

The beam displacement assembly 106 is arranged to enable laterally shifting the pump beam to adjust the position at which the pump beam meets a surface of the optical resonator assembly 108. This may involve, for example, shifting the pump beam with respect to the optical resonator assembly 108 in lateral direction, i.e. offsetting the pump beam. Consequently, the pump beam enters the optical resonator assembly 108 along an axis A' that is parallel (or coaxial) to the axis A and that is perpendicular to the surface of the optical resonator assembly 108. In the following, the position at which the pump beam meets the beam-displacement-assembly-facing surface of the optical resonator assembly 108 is predominantly referred to as a pump spot. Hence, the beam displacement assembly 106 enables adjusting the position of the pump spot on the surface of the optical resonator assembly 108. Depending on the manner of adjusting the position of the pump spot, and hence the position of the axis A' with respect to the axis A, the portion of the pump beam entering the optical resonator assembly 108 is referred to in the following as an offset pump beam or as a shifted pump beam.

In the scenario illustrated in FIG. 1, the axis A' shown by a respective dashed line indicates the center axis of the offset pump beam, whereas in the course of operation of the beam displacement assembly 106 the position of the center axis A' of the offset pump beam with respect to the center axis A of the pump beam, and hence the position of the pump spot on the surface of the optical resonator assembly 108, may change or may be changed in accordance with operation of the beam displacement assembly 106.

The beam displacement assembly 106 may be further arranged to focus the offset or shifted pump beam to a predefined distance from the beam displacement assembly 106. The predefined distance preferably places the focal plane of the offset pump beam on such a position within the laser gain medium of the optical resonator assembly 108 that maximizes the power of the laser. Hence, the offset pump beam is typically focused on a position that is behind the surface of the optical resonator assembly 108 in the axis A'. In this regard, the beam displacement assembly 106 may comprise a pump beam focusing assembly for focusing the offset pump beam accordingly, wherein the pump beam focusing assembly may comprise one or more optical components, e.g. one or more lenses and/or one or more mirrors.

The optical resonator assembly 108 is arranged to generate the pulsed output beam based on the (offset or shifted) pump beam received thereat using a suitable optical resonator arrangement known in the art. As described in the foregoing, the pump spot on the surface of the optical resonator assembly 108 may be offset from the center axis A of the laser arrangement 100 by operation of the beam displacement assembly 106 and, consequently, also the center axis of the pulsed output beam emitted from the optical resonator assembly 108 is offset from the axis A accordingly. Typically, the pulsed output beam provided from the optical resonator assembly 108 has the same center axis with the (offset or shifted) pump beam that enters the optical resonator assembly 108, i.e. the axis A'.

Examples pertaining to the structure and further details of operation of the beam displacement assembly 106 and the optical resonator assembly 108 are provided later in this text.

The output beam focusing assembly 110 is arranged to focus the pulsed output beam into the target point 112 that is at a predefined distance L from the output beam focusing assembly 110 (and hence from the laser arrangement 100). The output beam focusing assembly 110 may comprise one or more optical components arranged to focus the pulsed output beam at the distance L from the output beam focusing assembly 110. The optical components of the output beam focusing assembly 110 may comprise e.g. one or more lenses and/or one or more mirrors.

In an example, the optical components of the output beam focusing assembly 110 are arranged to provide a fixed focus distance L. In another example, the optical components of the output beam focusing assembly 110 enable adjusting the focus distance L either via user action (e.g. manual focus) or automatically (e.g. autofocus). Nevertheless, in all scenarios the focus distance L may be considered to be a predefined one in the sense that a desired or suitable focus distance L for instantaneous operation of the laser arrangement 100 is either defined by fixed arrangement of the optical components of the output beam focusing assembly 110 or set or selected via manual or automatic adjustment of the optical components of the output beam focusing assembly 110 to provide the desired or suitable focus distance.

The distance of the target point 112 from the center axis A of the laser arrangement 100 and/or from the center axis A' of the pulsed output beam obtained from the optical resonator assembly 108 may depend on characteristics of the output beam focusing assembly 110 and/or the distance between the respective center axes A and A' of the laser arrangement 100 and the pulsed output beam. In this regard, depending on characteristics of the output beam focusing assembly 110, the target point 112 may reside on (conceptual) plane at the distance L from the output beam focusing assembly 110 in the axis A' or in the axis A, whereas typically the target point resides between the axes A' and A. The position of the target point 112 in terms of its distance from the axis A at least partially depends on demagnification characteristics of the output beam focusing assembly 110: assuming magnification ratio M (where M<1, e.g. M=1:10) and a predefined distance R between the axes A and A', the target position 112 resides at distance R*M from the axis A (and hence at distance R−R*M from the axis A').

In another example, the laser arrangement 100 may be provided without output beam focusing assembly 110, thereby, conceptually, resulting in the pulsed output beam that diverges along the axis A'. Alternatively, the optical resonator assembly 108 may designed such that that it shapes (e.g. focuses) the pulsed output beam in a desired manner. As an example in this regard, an outer surface of a mirror that serves an output coupler of the optical resonator assembly 108 may be arranged to provide the desired shaping (e.g. focusing) of the pulsed output beam.

As described in the foregoing, the optical resonator assembly 108 may comprise a suitable optical resonator arrangement known in the art. Nevertheless, in the following some characteristics of a non-limiting example in this regard are described in order to facilitate discussion regarding some advantageous features of the laser arrangement 100.

Figure 2:
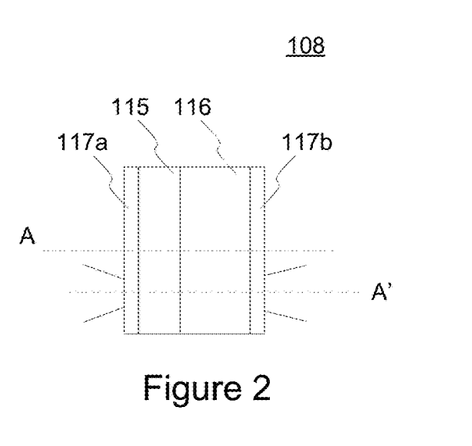
FIG. 2 schematically illustrates a structure of the optical resonator assembly according to an example.

FIG. 2 schematically illustrates a structure of the optical resonator assembly 108 according to a non-limiting example, where the optical resonator assembly 108 comprises an optical resonator provided as a sub-assembly of solid laser medium 115 and a passive Q-switch 116, which is arranged between mirrors 117a, 117b. The sub-assembly that comprises the solid laser medium 115 and the passive Q-switch 116 may be referred to as an optical resonator. In an example, the mirrors 117a, 117b may comprise respective mirror elements coupled on both sides of the optical resonator, whereas in another example the mirrors 117a, 117b are provided at respective reflective coatings arranged in respective surfaces of the optical resonator. In other examples, the order of the solid laser medium 115 and the passive Q-switch 116 may be reversed from that depicted in the example of FIG. 2. Even through depicted in the example of FIG. 2 with the solid laser medium 115 and the passive Q-switch 116 and the mirrors 117a, 117b arranged next to each other without gaps therebetween, in some arrangements there may be a respective air gap between the mirror 117a and the solid laser medium 115, between the solid laser medium 115 and the passive Q-switch 116 and/or between the passive Q-switch 116 and the mirror 117b. The solid laser medium 115 may be also referred to as gain medium, laser gain medium, lasing material, etc. In the illustration of FIG. 2, the pump beam (e.g. the offset pump beam or the shifted pump beam) enters the optical resonator assembly 108 from the left side through a first mirror 117a and the pulsed output beam exists the optical resonator assembly 108 from the right side through a second mirror 117b. At least conceptually, the pump beam entering the optical resonator assembly 108 and the pulsed output beam exiting the optical resonator assembly 108 both have the axis A' as their center axis, while in a practical implementation the center axis of the propagation path of the pump beam and/or the pulsed output beam may not strictly follow the axis A' but approximately follows the axis A' (in other words, there may be a minor offset from the axis A'). The second mirror 117b may be also referred to as an output coupler.

In the optical resonator structure illustrated in FIG. 2, the pump beam originating from the collimator assembly 104 serves to 'pump' energy to the solid laser medium 115 and, consequently, to excite stimulated emission from the solid laser medium 115. The passive Q-switch 116 serves as a saturable absorber comprising material where the resonator loss is initially high but whose transmission increases when the fluence of light therein exceeds a threshold that is characteristic of the passive Q-switch 116 component, e.g. the material and the thickness of the passive Q-switch 116 element. As the energy pumped to the solid laser medium 115 continues to increase, laser radiation inside the optical resonator assembly 108 increases and, finally, the passive Q-switch 116 enters a saturated state where the energy in the optical resonator assembly 108 is quickly released in a form of an intense laser pulse through the second mirror 117b towards the output beam focusing assembly 110. After emitting the laser pulse, the passive Q-switch 116 returns to the initial high-loss state and the next laser pulse is generated once the energy in the optical resonator assembly 108 is again pumped to a sufficient level by the energy received in the pump beam. Such optical resonator arrangements are well known in the art. The path along which the pump light travels within the solid laser medium 115 may be referred to as a pumped volume.

The solid laser medium 115 of the optical resonator assembly 108 may comprise translucent solid material, such as crystal, ceramic or glass doped with an ion suitable for laser action. When employed together with the passive Q-switch 116, the solid laser medium 115 comprising (or made of) lasing material of such type enables generation of relatively high-energy laser pulses. On the other hand, lasing material of such type has a relatively low thermal conductivity (e.g. below 1 W/mK for glass materials), which may impose a limitation to (average) output power obtainable from optical resonator assembly 108. Alternatively or additionally, the lasing ion (of the lasing material) may be operating on a three level or a quasi-three level laser transition, which makes the laser efficiency strongly dependent on the temperature of the lasing material applied as the solid laser medium 115 due to the thermal population of the lower laser state.

Specific examples of material that may be applied as the solid laser medium 115 of the above-mentioned kind include Yb,Er-doped (ytterbium and erbium doped) phosphate glasses or a YAB (yttrium aluminum borate) crystal, which may be denoted as Er,Yb:glass and Er,Yb:YAB, respectively. Further non-limiting examples of materials suitable for serving as the solid laser medium 115 include Nd:glass, Nd:YAG, Yb:YAG, Er:YAG, Yb:glass and Er,Yb:GdAB, where Nd denotes neodymium, YAG stands for yttrium aluminum garnet and GdAB stands for gadolinium aluminum oxoborate.

Nevertheless, as described above, even though enabling generation of relatively high energy laser pulses, the relatively low thermal conductivity of lasing materials such as glass, a YAB crystal and a YAG crystal may impose a limitation to (average) output power obtainable from the optical resonator assembly 108 that makes use of such materials as the solid laser medium 115. In this regard, when the laser arrangement 100 is in operation, the energy conveyed by the pump beam results in generating heat at of the pumped volume of the solid laser medium 115 within the optical resonator assembly 108. Due to relatively low thermal conductivity, the heat generated therein dissipates relatively slowly and, consequently, the local temperature is increased. Hence, even though the output power obtainable from the optical resonator assembly 108 (and hence from the laser arrangement 100) could be increased simply by increasing the power of the pump beam, the maximum useable power is limited by thermal reduction of laser efficiency, thermal fracture, or melting of the solid state laser gain medium 115 within the pumped volume. Consequently, the thermal conductivity of the solid laser medium 115 imposes a limit to the output power obtainable from the optical resonator assembly 108 (and hence from the laser arrangement 100) via increasing the power of the pump beam.

In the laser arrangement 100, the problem of excessive heat generation in the solid laser medium 115 of the optical resonator assembly 108 may be addressed via operation of the beam displacement assembly 106: the beam displacement assembly enables moving the pump spot on the surface of the optical resonator assembly 108, thereby enabling movement of the pumped volume within which the heat is generated over time. Consequently, the movement of the pump spot may be applied to allow sufficient time for heat dissipation from heated parts of the solid laser medium 115, which in turn allows for usage of higher power pump beam to enable increasing the output power obtainable from the optical resonator assembly 108 (and hence from the laser arrangement 100) without risking damage in the solid laser medium 115.

The 'path' along which the pump is moveable on the surface of the optical resonator assembly 108 and/or the speed of movement may be selected according to desired increase in the power of the pump beam such that damage (e.g. melting or thermal fracture) in the solid laser medium 115 is avoided. Moreover, the 'path' and the speed of the movement of the pump spot may be further selected in accordance with the intended application of the laser arrangement 100. Non-limiting examples in this regard are described in the following.

Figure 3A:
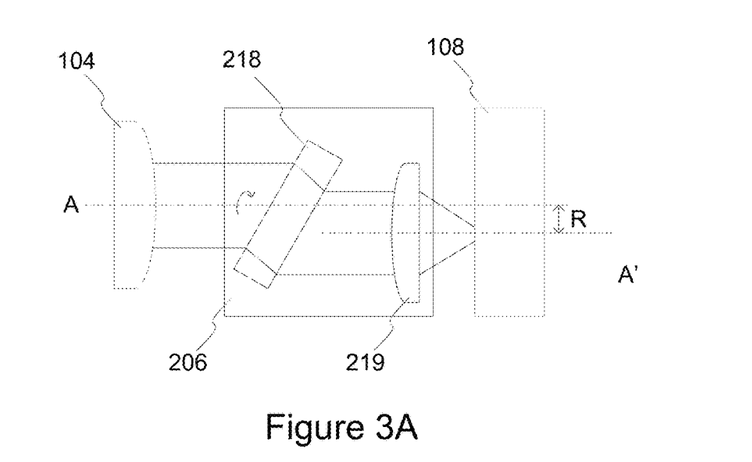
FIG. 3A schematically illustrates a rotatable assembly according to an example.

FIG. 3A schematically illustrates a rotatable assembly 206 that may be applied as the beam displacement assembly 106 in the laser arrangement 100. The rotatable assembly 206 is rotatable with respect to the collimator assembly 104 and the optical resonator assembly 108 (that are also illustrated in FIG. 3A) and it comprises a beam offset assembly 218 for offsetting the pump beam by a predefined distance R and a pump beam focusing assembly 219 for focusing the offset pump beam to a predefined distance from the rotatable assembly 206 along the axis A'. The beam displacement assembly 218 is preferably arranged in the propagation path of the pump beam such that the pump beam in its entirety transfers through the beam offset assembly 218. The beam offset assembly 218 is arranged in the rotatable assembly 206 in a fixed manner, such that its position and orientation with respect to the beam focusing arrangement 219 stays fixed despite the rotating movement of the rotatable assembly 206. In other words, the beam offset assembly 218 is arranged in a fixed oblique angle with respect to the propagation path of the pump beam. In a variation of the rotatable assembly 206, the order of the beam offset assembly 218 and the pump beam focusing assembly 219 in the optical path between the collimator assembly 104 and the optical resonator assembly 108 may be exchanged.

While in the illustration of FIG. 3A the pump beam focusing assembly 219 comprises a focusing lens, in a general case the pump beam focusing assembly 219 comprises one or more optical components, e.g. one or more lenses and/or one or more mirrors, arranged to focus the offset pump beam to the predefined distance from the rotatable assembly along the axis A'. As described in the foregoing, the focus point may be on a plane that is behind the surface of the optical resonator assembly 108 within the laser gain medium of the optical resonator assembly 108.

In an example, the beam offset assembly 218 comprises a transparent plate arranged in an oblique angle in the propagation path of the pump beam such that it offsets the pump beam by the distance R, which depends on characteristics of the transparent plate (e.g. its thickness and index of refraction at the applied wavelength(s)) and its angle of incidence with respect to the propagation path of the pump beam. The transparent plate may comprise a glass plate or a plate made of other transparent material, such as sapphire. In another example, the beam offset assembly 218 comprises e.g. a pair of mirrors or a pair of prisms arranged to serve as a periscope arrangement configured to offset the pump beam by the distance R. In general, such periscope assembly comprises one or more optical components, e.g. one or more lenses or prisms and/or one or more mirrors, arranged to provide the offset that is equal to the distance R. In a further example, the beam offset assembly 218 comprises a wedge-shaped transparent plate arranged to offset the pump beam by the distance R.

Figure 3B:
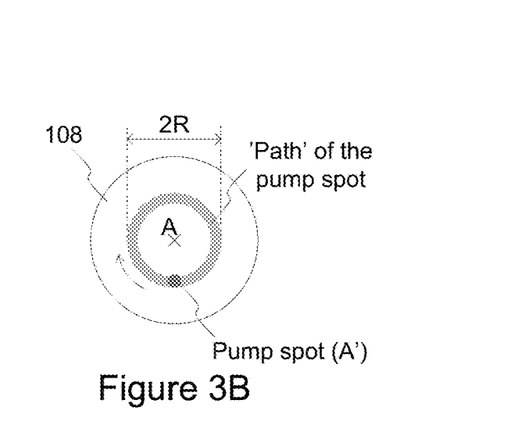
FIG. 3B schematically illustrates the movement of a pump spot on the surface of the optical resonator assembly according to an example.

The rotatable assembly 206 is rotatable about the axis A, thereby enabling adjustment of the position at which the offset pump beam meets the surface of the optical resonator assembly 108. The rotation of the rotatable assembly 206 results in movement of the pump spot on the surface of the optical resonator assembly 108 along a circular path having the radius R. The distance R may be selected e.g. from a range 0.5 to 5 mm, in dependence of the overall size of the laser arrangement 100 and/or in dependence of the desired or allowable deviation of the pump spot from the axis A, which may (further) depend on the intended usage of the laser arrangement 100. FIG. 3B further schematically illustrates the movement of the pump spot on the surface of the optical resonator assembly 108 along with rotation of the rotatable assembly 206: when the rotatable assembly 206 is rotated about the axis A (shown as a cross in the illustration of FIG. 3B), the axis A', and hence the pump spot, moves around the axis A along the circular 'path' having the radius R (the 'path' shown in light gray color in the illustration of FIG. 3B). Consequently, due to constant circular movement of the pump spot there is no continuous heating applied to the same pumped volume of the solid laser medium 115 within the optical resonator assembly 108, whereas suitable selection of the rotation speed ensures sufficient heat dissipation from the pumped volume of the solid laser medium 115 before the pump spot is brought again to the same location.

The applied speed of rotation of the rotatable assembly 206 may be selected as a compromise between two possibly competing requirements. The first requirement is that the laser efficiency is not reduced significantly due to the movement of the pump spot and hence the movement of the pumped volume with the solid laser medium 115 of the optical resonator assembly 108. This depends on the surface speed and the fluorescence lifetime of the laser transition in the solid laser medium 115. The second requirement may arise from the application of the laser arrangement 100: if applied for example in a LIBS analyzer device, an optimum scan speed on the LIBS target may depend on multiple factors such as the pulse energy, pulse repetition rate, and desired pulse overlap on the target. For an example, a 40 μJ 10 kHz system could require a surface speed of 3 mm/s on the target, which corresponds to a surface speed of 30 mm/s on the laser gain medium if the output beam focusing assembly 110 (provided e.g. as a beam focusing telescope) has a typical magnification ratio of M=1:10.

Figure 4A:
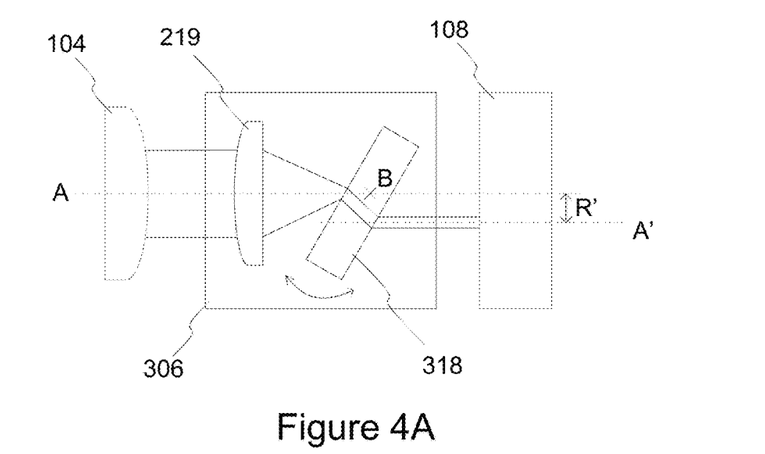
FIG. 4A schematically illustrates a beam adjustment assembly according to an example.

FIG. 4A schematically illustrates a beam adjustment assembly 306 that may be applied as the beam displacement assembly 106 in the laser arrangement 100. The beam adjustment assembly 306 is arranged in fixed position with respect to the collimator assembly 104 and the optical resonator assembly 108. The beam adjustment assembly 306 comprises a tiltable beam offset assembly 318 for offsetting the pump beam by a variable distance R' with respect to the axis A and the pump beam focusing assembly 219 for focusing the offset pump beam at the predefined distance from the beam adjustment assembly 306. In a variation of the beam adjustment assembly 306, the order of the tiltable beam offset assembly 318 and the pump beam focusing assembly 219 in the optical path between the collimator assembly 104 and the optical resonator assembly 108 may be exchanged.

The tiltable beam offset assembly 318 is tiltable (e.g. rotatable) about an axis B (indicated by a cross in the illustration of FIG. 4A) that is perpendicular to the axis A and hence perpendicular to the propagation path of the pump beam, thereby enabling adjustment of the position at which the offset pump beam meets the surface of the optical resonator assembly 108. The axis B may intersect the axis A (as in the example of FIG. 4A) or the axis B may offset from the axis A. The tiltable beam offset assembly 318 is preferably arranged in the propagation path of the pump beam such that the pump beam in its entirety transfers through the tiltable beam offset assembly 318. The angle of incidence between the tiltable beam offset assembly 318 and the propagation path of the pump beam (the axis A) may be adjustable between predefined minimum and maximum tilting angles, thereby offsetting the pump beam from the axis A by the distance R' that depends on the current tilting angle between the tiltable beam offset assembly 318 and the axis A.

In an example, the tiltable beam offset assembly 318 comprises a tiltable transparent plate arranged in the propagation path of the pump beam such that it offsets the pump beam by the distance R' that depends on the current angle of incidence between the tiltable transparent plate and the axis A, while in another example the tiltable beam offset assembly 318 comprises e.g. a pair of mirrors or a pair of prisms arranged to serve as a tiltable periscope arrangement configured to offset the pump beam by the distance R' that depends on the current angle between the tiltable periscope arrangement and the axis A.

Figure 4B:
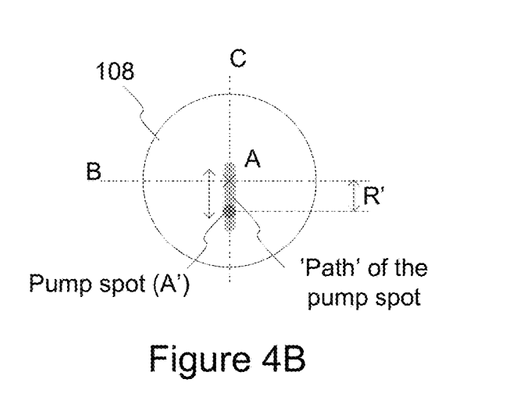
FIG. 4B schematically illustrates the movement of a pump spot on the surface of the optical resonator assembly according to an example.

The tiltable beam displacement assembly 318 enables movement of the pump spot on the surface of the optical resonator assembly 108 within a linear path along an axis C that is perpendicular to the axes A and B. FIG. 4B further schematically illustrates the movement of the pump spot on the surface of the optical resonator assembly 108 along with tilting of the tiltable beam displacement assembly 318: when the tiltable beam displacement assembly 318 is tilted (e.g. rotated) about the axis B, the axis A', and hence the pump spot, moves with respect to the axis A (indicated by a cross in the illustration of FIG. 4B) within a linear path (shown in light gray color in the illustration of FIG. 4B) that coincides with the axis C. The end points of the linear path are defined by the minimum and maximum tilting angles, whereas the position of the pump spot depends on the current tilting angle. Consequently, due to constant linear movement of the pump spot there is no continuous heating applied to the same pumped volume of the solid laser medium 115 within the optical resonator assembly 108, whereas suitable selection of the movement speed ensures sufficient heat dissipation from pumped volume of the solid laser medium 115 before the pump spot is brought again to the same location. The considerations with respect to rotation speed of the rotatable assembly 206 apply to the tilting (e.g. rotation) speed of the tiltable beam displacement assembly 318 as well, mutatis mutandis.

Figure 5A:
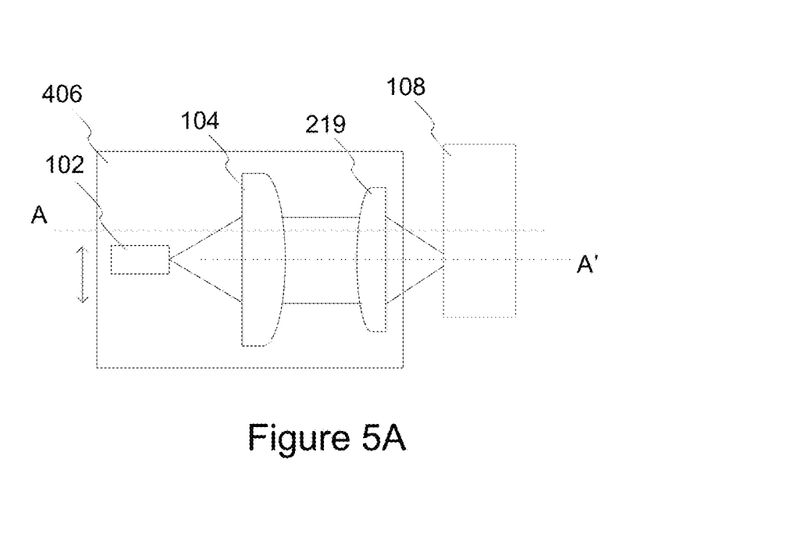
FIG. 5A schematically illustrates a laterally moveable assembly according to an example.

FIG. 5A schematically illustrates a laterally moveable assembly 406 that may be applied as the beam displacement assembly 106 in the laser arrangement 100. The laterally moveable assembly 406 is moveable at least in direction of the axis C, which is perpendicular to the axis A. The laterally moveable assembly 406 comprises the light source 102, the collimator assembly 104 and the pump beam focusing assembly 219.

Figure 5B:
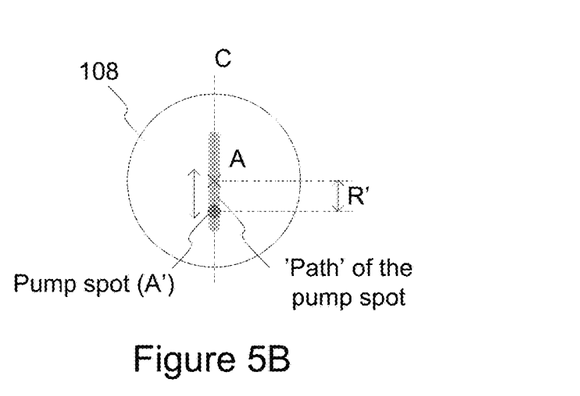
FIG. 5B schematically illustrates the movement of a pump spot on the surface of the optical resonator assembly according to an example.

The laterally moveable assembly 406 enables shifting the pump beam by a variable distance R' with respect to the axis A and, consequently, moving the pump spot within a linear path along the axis C, thereby enabling adjustment of the position at which the shifted pump beam meets the surface of the optical resonator assembly 108. FIG. 5B further schematically illustrates the movement of the pump spot on the surface of the optical resonator assembly 108 along with movement of the laterally moveable assembly 406: when the laterally moveable assembly 406 is moved along the axis C, the axis A', and hence the pump spot, moves with respect to the axis A (indicated by a cross in the illustration of FIG. 5B) within a linear path (shown in light gray color in the illustration of FIG. 5B) that coincides with the axis C. The end points of the linear path are defined by the respective end points of the lateral movement allowed for the laterally moveable assembly 406, whereas the position of the pump spot depends on the current position of the laterally moveable assembly 406 with respect to the axis A. Consequently, due to constant linear movement of the pump spot there is no continuous heating applied to the same pumped volume of the solid laser medium 115 within the optical resonator assembly 108, whereas suitable selection of the movement speed ensures sufficient heat dissipation from the pumped volume of the solid laser medium 115 before the pump spot is brought again to the same location. The considerations with respect to rotation speed of the rotatable assembly 206 apply to the movement speed of the laterally moveable assembly 406 as well, mutatis mutandis.

While the above example pertaining to the laterally moveable assembly 406 refers to movement along the axis C, in other examples the laterally moveable assembly 406 may be additionally moveable with respect to another axis, e.g. the axis B that is perpendicular to the axes A and C, thereby providing further freedom in moving the pump spot on the beam-displacement-assembly-facing surface of the optical resonator assembly 108

The movement of the beam displacement assembly 106 may be provided via usage of a suitable motor arrangement known in the art. Referring back to the non-limiting examples of providing the beam displacement assembly 106 described in the foregoing, as non-limiting examples, the rotating movement of the rotatable assembly 206 and/or the tilting (e.g. rotation) of the tiltable beam displacement assembly 318 may be provided e.g. by a stepper motor coupled thereto, whereas the linear movement of the laterally moveable assembly 406 may be provided e.g. by a stepper motor, a linear DC motor or a piezoelectric motor coupled thereto.

The laser arrangement 100 illustrated in FIG. 1 serves as a non-limiting example for generating the pulsed output beam according to the technique that enables adjusting the position at which the pump beam meets the surface of the optical resonator assembly 108 and various modifications with respect to an optical arrangement that transfers the light output from the light source 102 into the offset pump beam may be applied without departing from the scope of the present disclosure. As an example in this regard, the pump beam may enter the beam displacement assembly 106 from a direction that is perpendicular to the axis A and the beam displacement assembly 106 may comprise a laterally moveable assembly including an optical arrangement (e.g. a mirror) provided in the propagation path of the pump beam for redirecting (e.g. reflecting) the pump beam to follow the axis A'. Hence, lateral movement of such laterally moveable assembly enables shifting the pump beam by a variable distance R' with respect to the axis A and, consequently, moving the pump spot within a linear path on the surface of the optical resonator assembly 108. In another non-limiting variation of the laser arrangement 100, the pump beam from the collimator assembly 104 may have a center axis that is not parallel with the axis A (e.g. has its center axis perpendicular to the axis A) and the pump beam may be redirected by an optical arrangement (e.g. a mirror) to the beam displacement assembly 106 along the axis A.

Along the lines described in the foregoing, a LIBS analyzer device may include an excitation means for invoking an optical emission from a surface of a sample under study, a light collection arrangement for transferring the optical emission to a spectrometer for dispersing the optical emission into different wavelengths, a detector means for capturing signals that are descriptive of the dispersed optical emission and an analysis means for determination of the elemental composition of the sample under study on the basis of the captured signals. The laser arrangement 100 may be applied, for example, as an excitation means in such a LIBS analyzer device.

In such a LIBS analyzer device, the laser arrangement 100 is arranged in a front end of a casing of the LIBS analyzer device, such that when the front end of the LIBS analyzer device is placed close to or against the surface of a sample, the pulsed output beam is directed (e.g. focused) at the target point 112 that is at or approximately at the surface of the sample. The front end of the casing further houses at least the light collection optics, whereas the other elements of the LI BS analyzer device described in the foregoing may be arranged at or close to the front end of the casing or in other parts of the casing.

In operation of the LIBS analyzer device, the pulsed output beam emitted from the laser arrangement 100 result in forming a plasma plume on a surface of the sample, which in turn invokes optical emission at wavelength(s) that are characteristic to elements on the surface of the sample. The light emission is transferred via the light collection arrangement to the spectrometer, from which the dispersed optical emission is guided to the detector means, which captures detector signals that are descriptive of the dispersed optical emission and that serve as basis for analysis of elemental composition of the sample by the analysis means. The analysis may be based on intensity distribution of dispersed optical emission across a range of wavelengths.

In addition to enabling generation of the pulsed output beam of higher energy than enabled by the previously known laser assemblies, the laser arrangement 100 further provides an inherent further advantage when applied as the excitation means of the LIBS analyzer device: as described in the foregoing, the movement of the pump spot may typically also result in movement of the target point 112 in vicinity of the center axis A accordingly, thereby forming a 'scanning path' along the surface of the sample. This is advantageous in that the movement of the target point 112 along the surface of the sample results in formation of a plasma plume from a larger area on the surface of the sample, which allows for averaging the elemental composition of the sample over the length of the 'scanning path' and hence contributes towards more accurate and reliable analysis.

Figure 6:
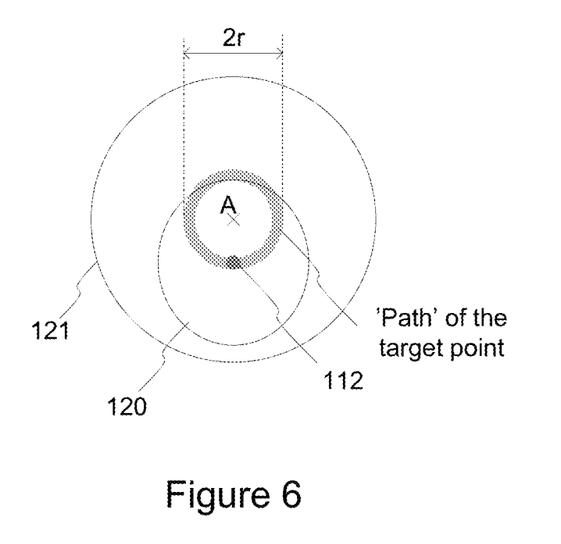
FIG. 6 schematically illustrates movement of a target point on a plane according to example.

FIG. 6 schematically illustrates the movement of the target point 112 on a plane that is perpendicular to the axes A and A' at the distance L from the output beam focusing assembly 110 when using the rotatable assembly 206 as the beam displacement assembly. Rotation of the pump spot due to rotation of the rotatable assembly 206 results in the target point 112 moving around the axis A along a circular 'scanning path' having a radius r (the 'scanning path' shown in light gray color in the illustration of FIG. 6). A plasma spot 120 centered at the target point 112 follows the circular movement of the target point 112, thereby effectively resulting in a significantly larger plasma plume within a view area 121 of the light collection optics of the LIBS analyzer device (in comparison to one arising from a substantially stationary target point 112).

In case the output beam focusing assembly 110 comprising an optical focusing arrangement that converges the pulsed output beam (exiting from the optical resonator assembly 108 along the axis A') towards the axis A, the radius r may be significantly smaller than the radius R of the pump spot on the surface of the optical resonator assembly 108 (e.g. by a ratio 1:10). This is typically advantageous since while larger radius R implies longer time for heat dissipation from a certain pumped volume of the solid laser medium 115 within the optical resonator assembly 108, the radius r needs to be somewhat smaller to ensure efficient coupling of plasma light into the spectrometer via usage of a stationary light collection arrangement.

While the example of FIG. 6 serves to illustrate the advantageous effect arising from the movement of the target point 112 on the surface of the sample under study via references to the rotatable assembly 206, a similar kind of advantage arises from the movement of the target point 112 resulting from adjustment of the pump beam by operation of the beam adjustment assembly 306 or the laterally moveable assembly 406 as well, mutatis mutandis.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A laser arrangement comprising:
   a light source for generating light output;
      a collimator assembly for collimating the light output from the light source into a pump beam; and
      an optical resonator assembly for generating a pulsed output beam based on the pump beam directed thereat,
      wherein the laser arrangement comprises a beam displacement assembly arranged to laterally shift the pump beam to adjust the position at which the pump beam meets a surface of the optical resonator assembly,
   wherein the beam displacement assembly comprises:
      a rotatable assembly that is rotatable with respect to the collimator assembly and the optical resonator assembly about a first axis that coincides with the center axis of a propagation path of the pump beam, the rotatable assembly comprising a beam offset assembly having a transparent plate arranged in the propagation path of the pump beam to offset the pump beam by a predefined distance into an offset pump beam that is parallel to the pump beam.

2. A laser arrangement according to claim 1, further comprising an output beam focusing assembly arranged to focus the pulsed output beam at a predefined distance from the output beam focusing assembly.

3. A laser arrangement according to claim 2, wherein the output beam focusing assembly comprises an optical focusing arrangement for converging the pulsed output beam that enters the output beam focusing assembly off the optical axis of the output beam focusing assembly towards said optical axis.

4. A laser arrangement according to claim 1, wherein the rotatable assembly comprises
   a pump beam focusing assembly arranged to focus the offset pump beam to a predefined distance from the rotatable assembly, wherein the beam offset assembly has a fixed position and orientation with respect to the pump beam focusing assembly.

5. A laser arrangement according to claim 1, wherein the optical resonator assembly comprises a solid laser medium and a passive Q-switch, wherein the solid laser medium and the passive Q-switch are arranged between two mirrors.

6. A laser arrangement according to claim 5, wherein the solid laser medium comprises one of the following: a crystal, a glass, ceramic material.

7. A laser arrangement according to claim 5, wherein the solid laser medium comprises one of the following:
   Er,Yb:glass,
   Er;Yb:YAB,
   Nd:glass,
   Yb:YAG,
   Er:YAG,
   Nd:YAG,
   Yb:glass, and
   Er,Yb:GdAB.

8. A laser-induced breakdown spectroscopy (LIBS) analyzer device for analysis of elemental composition of a sample, the LIBS analyzer device comprising:
   a laser arrangement arranged in a front end of a casing of the LIB S analyzer device such that when the front end of the LIBS analyzer device is placed close to or against a surface of the sample, the pulsed output beam is directed at a target point that is at or approximately at the surface of the sample,
   wherein the laser arrangement comprises:
      a light source for generating light output;
      a collimator assembly for collimating the light output from the light source into a pump beam; and
      an optical resonator assembly for generating a pulsed output beam based on the pump beam directed thereat, wherein the laser arrangement comprises a beam displacement assembly having one or more optical components disposed in the propagation path of the pump beam that are arranged to laterally shift the pump beam to adjust the position at which the pump beam meets a surface of the optical resonator assembly.

9. A laser-induced breakdown spectroscopy analyzer device according to claim 8, wherein the beam displacement assembly comprises a rotatable assembly that is rotatable with respect to the collimator assembly and the optical resonator assembly about a first axis that coincides with the center axis of a propagation path of the pump beam,
the rotatable assembly comprising:
a beam offset assembly for offsetting the pump beam by a predefined distance into an offset pump beam that is parallel to the pump beam; and
a pump beam focusing assembly for focusing the offset pump beam to a predefined distance from the rotatable assembly,
wherein the beam offset assembly has a fixed position and orientation with respect to the pump beam focusing assembly.

10. A laser-induced breakdown spectroscopy analyzer device according to claim 8, wherein the beam displacement assembly comprises beam adjustment assembly that is arranged in a fixed position with respect to the collimator assembly and the optical resonator assembly,
the beam adjustment assembly comprising:
a tiltable beam offset assembly for offsetting the pump beam by a variable distance into an offset pump beam that is parallel to the pump beam; and
a pump beam focusing assembly for focusing the pump beam to a predefined distance from the beam adjustment assembly, wherein the tiltable beam offset assembly is tiltable about a second axis that is perpendicular to a first axis that coincides with the center axis of a propagation path of the pump beam.

11. A laser-induced breakdown spectroscopy analyzer device according to claim 10, wherein the tiltable beam offset assembly comprises a transparent plate arranged in the propagation path of the pump beam.

12. A laser-induced breakdown spectroscopy analyzer device according to claim 10, wherein the tiltable beam offset assembly comprises a periscope assembly arranged in the propagation path of the pump beam.

13. A laser-induced breakdown spectroscopy analyzer device according to claim 8, wherein the beam displacement assembly comprises a laterally moveable assembly that is moveable with respect to the optical resonator assembly along at least a third axis that is perpendicular to a first axis that coincides with the center axis of a propagation path of the pump beam,
the laterally moveable assembly comprising:
the light source, the collimator assembly, and a pump beam focusing assembly for focusing the pump beam to predefined distance from the laterally moveable assembly.

14. A laser-induced breakdown spectroscopy analyzer device according to claim 8, wherein the optical resonator assembly comprises solid laser medium and a passive Q-switch arranged between two mirrors, and wherein the solid laser medium comprises one of the following:
Er,Yb:glass,
Er;Yb:YAB,
Nd:glass,
Yb:YAG,
Er:YAG,
Nd:YAG,
Yb:glass, and
Er,Yb:GdAB.

15. A laser arrangement comprising:
a light source for generating light output;
a collimator assembly for collimating the light output from the light source into a pump beam; and
an optical resonator assembly for generating a pulsed output beam based on the pump beam directed thereat,
wherein the laser arrangement comprises a beam displacement assembly for laterally shifting the pump beam to adjust the position at which the pump beam meets a surface of the optical resonator assembly, wherein the beam displacement assembly comprises a beam adjustment assembly that is arranged in a fixed position with respect to the collimator assembly and the optical resonator assembly, wherein the beam adjustment assembly comprises (i) a tiltable beam offset assembly for offsetting the pump beam by a variable distance into an offset pump beam that is parallel to the pump beam and (ii) a pump beam focusing assembly for focusing the pump beam to a predefined distance from the beam adjustment assembly,
wherein the tiltable beam offset assembly is tiltable about a second axis that is perpendicular to a first axis that coincides with the center axis of a propagation path of the pump beam.

16. A laser arrangement according to claim 15, further comprising an output beam focusing assembly arranged to focus the pulsed output beam at a predefined distance from the output beam focusing assembly.

17. A laser arrangement according to claim 16, wherein the output beam focusing assembly comprises an optical focusing arrangement for converging the pulsed output beam that enters the output beam focusing assembly off the optical axis of the output beam focusing assembly towards said optical axis.

18. A laser arrangement according to claim 15, wherein the optical resonator assembly comprises a solid laser medium and a passive Q-switch, wherein the solid laser medium and the passive Q-switch are arranged between two mirrors.

19. A laser arrangement comprising:
a light source for generating light output;
a collimator assembly for collimating the light output from the light source into a pump beam; and
an optical resonator assembly for generating a pulsed output beam based on the pump beam directed thereat,
wherein the laser arrangement comprises a beam displacement assembly for laterally shifting the pump beam to adjust the position at which the pump beam meets a surface of the optical resonator assembly, wherein the beam displacement assembly comprises a laterally moveable assembly that is moveable with respect to the optical resonator assembly along at least a third axis that is perpendicular to a first axis that coincides with the center axis of a propagation path of the pump beam, wherein the laterally moveable assembly includes the light source, the collimator assembly, and a pump beam focusing assembly, wherein the pump beam focusing assembly is arranged to focus the pump beam to a predefined distance from the laterally moveable assembly.

20. A laser arrangement according to claim 19, further comprising an output beam focusing assembly arranged to focus the pulsed output beam at a predefined distance from the output beam focusing assembly.

21. A laser arrangement according to claim 20, wherein the output beam focusing assembly comprises an optical focusing arrangement for converging the pulsed output beam that enters the output beam focusing assembly off the optical axis of the output beam focusing assembly towards said optical axis.

22. A laser arrangement according to claim 19, wherein the optical resonator assembly comprises a solid laser medium and a passive Q-switch, wherein the solid laser medium and the passive Q-switch are arranged between two mirrors.

* * * * *